Oct. 13, 1959 H. SCHURR ET AL 2,908,533
RESILIENT BEARING STRUCTURE
Filed March 1, 1956

INVENTORS
HANS SCHURR.
HANS STAHLECKER.
BY Dicke and Bray.
ATTORNEYS

United States Patent Office 2,908,533
Patented Oct. 13, 1959

2,908,533

RESILIENT BEARING STRUCTURE

Hans Schurr, Sussen, and Hans Stahlecker, Reichenbach im Tale, Germany

Application March 1, 1956, Serial No. 601,092

Claims priority, application Germany March 4, 1955

11 Claims. (Cl. 308—152)

The present invention relates to spinning and other textile spindles and elastic bearing means therefor.

It is an object of the present invention to provide a new and improved bearing structure for supporting and guiding a textile spindle so as to run normally within the accurate center of its housing, but to permit a certain elastic movement thereof when subjected to an excessive unbalance.

Another object of the invention is to provide a spindle mounting for stabilizing the operation of the spindle and for permitting the spindle to align itself.

These objects may be attained according to the invention by mounting the inner or lower end of the spindle so as to have a small radial play within a stabilizing bushing which, in turn, is being held in place within the spindle housing under spring pressure and centered therein with considerable radial play by means of conical centering surfaces.

A spindle which is mounted as described has the advantage that within the critical speed range it will be able to oscillate considerably, since the strong oscillations occurring at such speed act upon the stabilizing bushing so as to lift the same in the spindle housing along its conical centering surfaces and permit the bushing to shift in a lateral direction, while at the normal operating speed when the oscillations of the spindle are very small, the stabilizing bushing will be maintained centrally within the spindle housing due to the fact that the spring which acts upon the bushing will force the same to a central position upon the conical surface when a thin oil film between the inner spindle bearing and the stabilizing bushing is sufficient to dampen these small oscillations.

A further object of the invention is to utilize the coil spring which acts upon the stabilizing bushing, for maintaining the outer or collar bearing of the spindle, which is preferably mounted in the spindle housing by means of a ball-and-socket joint, so as to be positively connected with the housing but movable relative thereto. Such a collar bearing has the advantage of aligning itself automatically with the spindle shaft so that the latter cannot tilt relative to the collar bearing if the shaft due to a strong unbalance thereof during its rotation should become deformed.

Figure 1:
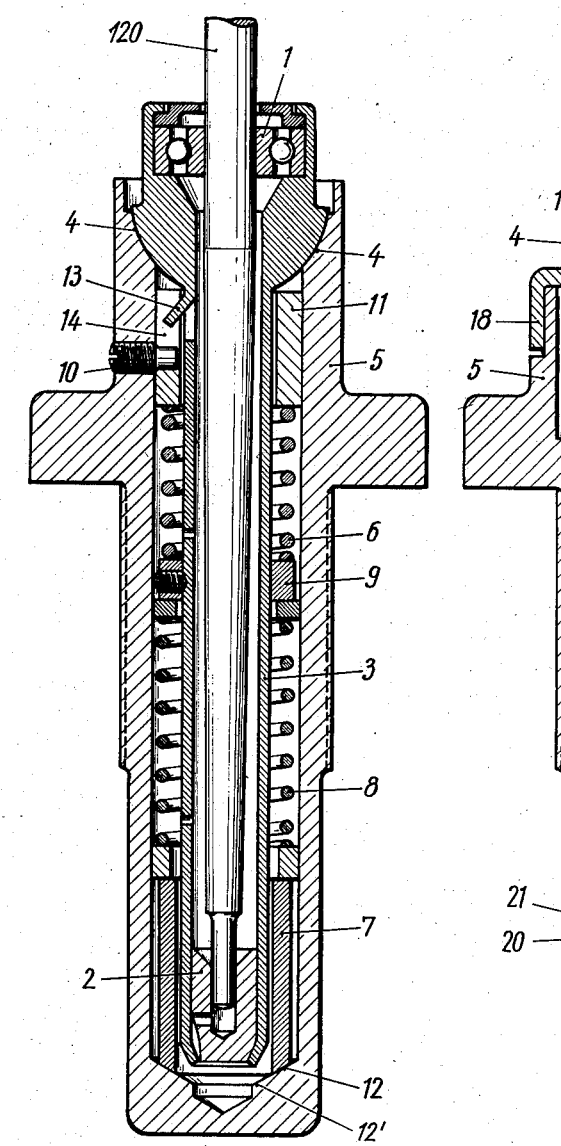
Figure 2:
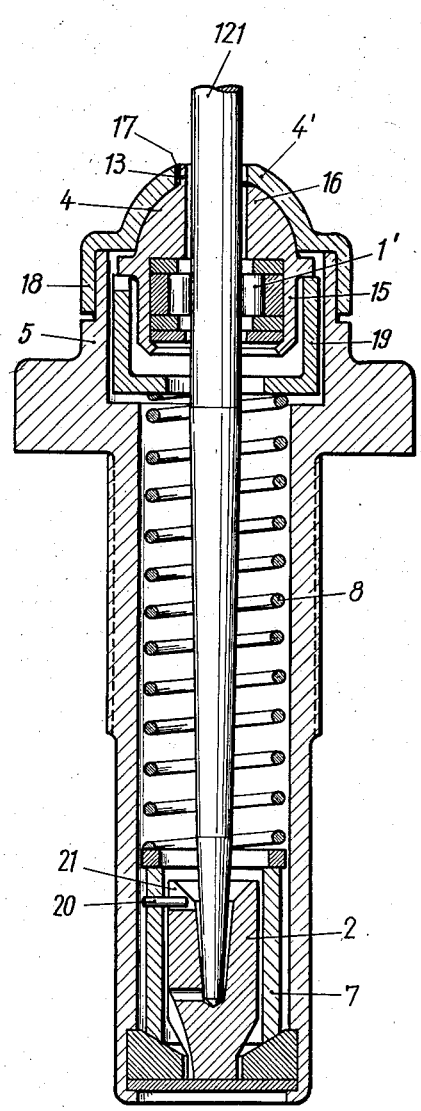

Further objects, features, and advantages of the present invention will appear from the following detailed description thereof, particularly when read with reference to the accompanying drawings, in which Fig. 1 shows a longitudinal section through the spindle bearing structure according to the invention; while Fig. 2 shows a longitudinal section through a modification of the invention.

Referring to the drawings, and first particularly to Fig. 1, the spindle 120 is rotatably mounted within a spindle housing 5 by means of an upper collar ball bearing 1 at the outer end of the housing, and a lower slide or socket bearing 2 at the inner end. Bearings 1 and 2, in turn, are mounted within a sleeve 3 which is maintained in positive connection with spindle housing 5 but still movable relative thereto by means of a ball 4 on sleeve 3 which is pivotable within a corresponding socket at the outer end of housing 5, and a strong coil spring 6 which tends to draw sleeve 3 into housing 5. Spring 6 rests upon a connecting sleeve 11 which is retained in housing 5 by a set-screw 10, and acts upon a ring 9 which is screwed to sleeve 3 and also supports a second, considerably weaker coil spring 8 which acts upon a stabilizing bushing 7 around the inner end of sleeve 3. Bearing 2 is firmly secured in the lower end of sleeve 3 which is guided with a small radial play within the stabilizing bushing 7, while the latter is mounted with considerable radial play in the inner end of housing 5 and maintained centrally therein through the conical end surface 12 on bushing 7 which is forced by coil spring 8 upon its corresponding conical seat 12' at the inner end of housing 5. After loosening setscrew 10, sleeve 3, together with bearings 1 and 2, connecting sleeve 11, and spring 6 may be easily removed from spindle housing 5, whereupon spring 8 and stabilizing sleeve 7 may also be withdrawn. A projecting lug 13 on sleeve 3 engages into a slot 14 of connecting sleeve 11 to prevent sleeve 3 from rotating relative to housing 5.

In the modification of the invention as shown in Fig. 2, the outer collar bearing 1' and inner end bearing 2 are not connected by a sleeve as shown in Fig. 1. Bearing 1', which in this case has been shown to be a roller bearing, is secured within a bearing case 16, the upper end 4 of which is ball-shaped and mounted within a corresponding cap 4' which is secured to spindle housing 5. A coil spring 8 within housing 5 acts through an intermediate cup-shaped socket 19 upon bearing case 16 so as to urge the same pivotally against cap 4'. The inner end bearing 2 is secured separate from bearing 1' and thus capable of following any movements of shaft 121. The latter is thus safely protected from jamming or binding in roller bearing 1' even though, due to strong unbalancing forces acting upon spindle 121, the oscillations of the latter should become very large and the stabilizing bushing 7 should no longer be able to maintain the inner end of the spindle exactly in the center of housing 5.

The two embodiments of the invention as shown in Figs. 1 and 2 also differ from each other insofar as the latter is ordinarily not intended to permit the bearings and stabilizing device to be disassembled in the spinning mill since cap 18 is permanently secured to housing 5. Although cap 18 may also be removably secured to housing 5 this will usually not be required since the latter may be easily cleaned out in a manner known as such, for example, by suction.

If subjected to considerable stresses, the outer bearing 1' of the spindle shown in Fig. 2 will carry out small rotary movements which might disturb the even and regular rotation of the spindle. Such rotary movements of the outer bearing 1' may be avoided by providing the ball-shaped bearing case 16 with a projecting lug 13 which engages in a recess 17 in cap 18. On the other hand, a locking pin 20 in stabilizing bushing 7 of Fig. 2 loosely engages in a recess 21 in the inner end bearing 2 and thus prevents the latter from turning relative to bushing 7.

Although my invention has been illustrated and described with reference to the preferred embodiments thereof, we wish to have it understood that it is in no way limited to the details of such embodiments or to the specific examples described, but is capable of numerous modifications within the scope of the appended claims.

Having thus fully disclosed our invention, what we claim is:

1. A flexible bearing structure for a textile spindle comprising a housing adapted to surround said spindle and having a conical seat near the inner end thereof, bearing means including a pair of bearings within said housing near the inner and outer ends thereof for supporting said spindle, a stabilizing bushing within said housing surrounding said inner bearing, said inner bearing being guided within said housing exclusively by said stabilizing bushing, and said stabilizing bushing being normally spaced at a relatively small radial distance from said inner bearing and being normally surrounded directly by said housing at a greater radial distance therefrom, said bushing having a conical end surface adapted to engage with said conical seat in said housing, and spring means in said housing and acting upon said bushing for normally maintaining the same accurately centered on said conical seat.

2. A flexible bearing structure for a textile spindle comprising a housing having a conical seat near the inner end thereof, a sleeve extending substantially through said housing and having means for pivotally mounting the same in said housing near the outer end thereof, a pair of bearings for supporting said spindle within said sleeve and both of said bearings being secured therein near the opposite ends thereof, a stabilizing bushing surrounding said sleeve near the inner end thereof and normally spaced at a small radial distance from said sleeve and being normally surrounded by said housing at a greater radial distance therefrom, said bushing having a conical end surface adapted to engage with said conical seat in said housing, and a pair of springs within said housing, one of said springs being of greater strength and acting upon said sleeve for maintaining said pivotal means in positive engagement with said housing, the other spring acting upon said bushing for normally maintaining the same accurately centered on said conical seat.

3. A flexible bearing structure for a textile spindle comprising a housing having a conical seat near the inner end thereof, a pair of bearings within said housing near the inner and outer ends thereof for supporting said spindle, means for pivotally mounting the outer bearing relative to said housing, means for mounting the inner bearing independently of said outer bearing including a stabilizing bushing in said housing surrounding said inner bearing and normally spaced at a small radial distance therefrom and being normally surrounded by said housing at a greater radial distance therefrom, said bushing having a conical end surface adapted to engage with said conical seat in said housing, and spring means in said housing and acting upon said bushing for normally maintaining the same accurately centered on said conical seat, said inner bearing thus being mounted so as to be movable in a radial direction against the action of said spring means but independently of said outer bearing.

4. A flexible bearing structure for a textile spindle comprising a housing having a conical seat near the inner end thereof, a pair of bearings within said housing near the inner and outer ends thereof for supporting said spindle, means for pivotally mounting the outer bearing relative to said housing, means for mounting the inner bearing independently of said outer bearing including a stabilizing bushing in said housing surrounding said inner bearing and normally spaced at a small radial distance therefrom and being normally surrounded by said housing at a greater radial distance therefrom, said bushing having a conical end surface adapted to engage with said conical seat in said housing, and spring means in said housing and acting upon said pivotal means and said bushing for maintaining said pivotal means in positive engagement with said housing and for normally maintaining said bushing accurately centered on said conical seat.

5. A flexible bearing structure as defined in claim 1, further comprising means for preventing said inner bearing from rotating relative to said stabilizing bushing.

6. A flexible bearing for a textile spindle comprising a housing adapted to surround said spindle and having a conical seat near the inner end thereof, bearing means for said spindle including a pair of bearings near the outer and inner ends in said housing, pivotal sleeve means within said housing for rigidly connecting said pair of bearings, a stabilizing bushing within said housing surrounding said inner bearing and normally spaced therefrom at a relatively small distance and being normally surrounded by said housing with a relatively larger distance, said stabilizing bushing being provided with a conical end surface adapted to engage with said conical seat, and spring means in said housing acting on said stabilizing bushing for normally maintaining the same accurately centered in said conical seat.

7. A flexible bearing for a textile spindle comprising a housing having a conical seat near the inner end thereof, bearing means including a pair of bearings within said housing near the inner and outer ends thereof for supporting said spindle, means for pivotally mounting the outer bearing relative to said housing including means for retaining said outer bearing in the axial direction of said spindle and further including a member enclosing said outer bearing, said member having a pivotal connection with an interior wall of said housing, means for mounting the inner bearing in said housing, a stabilizing bushing in said housing surrounding said inner bearing and normally spaced at a relatively small distance therefrom while being normally surrounded by said housing at a relatively greater radial distance therefrom, said bushing having a conical end surface adapted to engage with said conical seat in said housing, and spring means in said housing and acting upon said pivotal means and said stabilizing bushing for maintaining said pivotal means in engagement with said housing and for normally maintaining said bushing accurately centered on said conical seat.

8. A flexible bearing structure for a textile spindle as defined in claim 1, wherein said outer bearing is enclosed in a casing, and said casing and housing are provided with mutually coacting members enabling said casing to be pivotable relative to said housing.

9. A flexible bearing structure as defined in claim 1, wherein said outer bearing is enclosed in a casing, and ball and socket connection means between said casing and said housing.

10. A flexible bearing structure according to claim 9, wherein a lost motion connection is provided between said inner bearing and said stabilizing bushing.

11. A flexible bearing according to claim 10, wherein said lost motion connection comprises a pin carried by said bushing and a coacting recess in said inner bearing.

References Cited in the file of this patent

UNITED STATES PATENTS

| | | |
|---|---|---|
| 1,338,904 | Chapman | May 4, 1920 |
| 2,350,272 | Cobb | May 30, 1944 |
| 2,680,659 | Morrison et al. | June 8, 1954 |
| 2,758,895 | Broyles | Aug. 14, 1956 |